United States Patent [19]

Lurz

[11] Patent Number: 4,664,345
[45] Date of Patent: May 12, 1987

[54] METHOD FOR STABILIZING LAMINAR SEPARATED BOUNDARY LAYERS

[75] Inventor: Werner Lurz, Hamburg, Fed. Rep. of Germany

[73] Assignee: Messerschmitt-Boelkow-Blohm Gesellschaft mit beschrankter Haftung, Munich, Fed. Rep. of Germany

[21] Appl. No.: 898,736

[22] Filed: Aug. 15, 1986

Related U.S. Application Data

[63] Continuation of Ser. No. 670,868, Nov. 13, 1984, abandoned.

[30] Foreign Application Priority Data

Nov. 24, 1983 [DE] Fed. Rep. of Germany ....... 3342421

[51] Int. Cl.⁴ .................. B64C 21/06; B64C 21/08
[52] U.S. Cl. .................................. 244/209; 244/199; 244/208; 244/130
[58] Field of Search ............... 244/200, 199, 204, 207, 244/208, 209, 130

[56] References Cited

U.S. PATENT DOCUMENTS

| | | | |
|---|---|---|---|
| 3,128,063 | 4/1964 | Kaplan | 244/207 |
| 3,261,576 | 7/1966 | Valyi | 244/130 |
| 3,360,221 | 12/1967 | Heskestad | 244/130 |
| 3,507,463 | 4/1970 | Kuntz | 244/208 |
| 3,820,628 | 6/1974 | Hanson | 244/208 |

FOREIGN PATENT DOCUMENTS 854994 11/1970 Canada ..................... 244/204
3043567 7/1982 Fed. Rep. of Germany .

OTHER PUBLICATIONS

"Laminar Flow a Reality", May 15, 1982, *Flight.*
Hahn & Pfenninger, J. Aircraft, 10 (1973) pp. 618–622, "Prevention of Transition over Backward Step by Suction".
Truckenbrodt-Schlichting, "Aerodynamik des Flugzeugs", vol. 1, 1959, Publ.: Springer Verlag, pp. 260 to 263.

*Primary Examiner*—Joseph F. Peters, Jr.
*Assistant Examiner*—Lynn M. Fiorito
*Attorney, Agent, or Firm*—W. G. Fasse; D. H. Kane, Jr.

[57] ABSTRACT

Separated laminar flow boundary layers are stabilized by delaying a transition into a turbulent flow and by reducing the size of the laminar boundary layer separation zone downstream of a disturbance in the surface contour of a body in the flow, such as a backward step in the body surface, e.g., where sheet metal layers overlap in the surface of an aircraft wing. This purpose is accomplished by suction inlets in the surface just upstream of the disturbance and blowing outlets just downstream of the disturbance and by a flow channel interconnecting these inlets and outlets. Passage of a portion of the flowing medium through these passages is automatically assured due to a pressure differential between the inlets and outlets.

15 Claims, 4 Drawing Figures

METHOD FOR STABILIZING LAMINAR SEPARATED BOUNDARY LAYERS

This application is a continuation of application Ser. No. 670,868, filed Nov. 13, 1984, now abandoned.

FIELD OF THE INVENTION

The invention relates to a method for stabilizing laminar separated boundary layers in a flow around a body such as an aircraft wing to thereby achieve a viscous drag reduction by employing the principle of boundary layer suction and boundary layer blowing referred to herein as boundary layer control.

DESCRIPTION OF THE PRIOR ART

A transition from laminar to turbulent flow generally takes place directly downstream of the separation point where a laminar boundary layer separates from the surface of the body along which the flow travels. The transition takes place because separated boundary layers are less stable than boundary layers still in contact with the body surface. As a result, the boundary layer again in contact with the body surface downstream of the separation bubble is turbulent and the correspondingly higher surface friction results in a higher drag. A boundary separation zone may, for example, be a so-called backward step in the surface of the body, for example, where two planking sheets of an aircraft wing overlap.

Efforts have been made in the past to maintain a laminar flow even in the separation zone by sucking off boundary layer material in the same manner as is known for a not yet separated boundary layer. The suction takes place through the boundary surface and has been accomplished into the range of high Reynolds numbers. Reference is made in this connection to an article entitled: "Prevention of Transition Over a Backward Step by Suction" by M. Hahn & W. Pfenninger, published in J. Aircraft, Volume No. 10, October 1973, pages 618 to 622. The suction takes place in the normal direction, more specifically, normal or perpendicularly to the local tangent. This prior art teaching is, however, successful only if the suction takes place directly upstream of the separation zone or in the vicinity of the reattachment points. Applying suction directly downstream of the separation zone, on the other hand, leads to an increased instability and to a transition even sooner than without such a suction directly downstream of the separation zone.

Another method for blowing into a laminar separation zone is disclosed in German Pat. No. 3,043,567 (Quast et al). This German Patent discloses a method primarily intended for wings having smooth surfaces, for example, for glider planes, employing the effect that in response to a very hard blowing a laminar separation zone turns abruptly into a tubulent zone, thereby reducing its volume. This reduction in the size of the turbulent separation zone results in a gain in the pressure drag, however, the boundary layer which is reattached to the surface, is itself turbulent, whereby a larger wall friction is present than with a laminar boundary layer.

A book entitled "Aerodynamik Des Flugzeugs" by Truckenbrodt-Schlichting, Volume 1, 1959, published by Springer Verlag, pages 260 to 263 describes in a chapter "Acceleration of the Boundary Layer" possibilities of avoiding separation of the decelarated liquid particles in the boundary layer by blowing additional energy into the friction or boundary layer. One way of adding energy is to blow liquid from the inside of the body into the boundary layer by a special blower. A simpler method involves taking the energy directly out of the main flow from an area of high pressure. The liquid particles are then blown through a slot into the decelerated boundary layer. In both instances energy is supplied into the boundary layer adjacent to the surface, whereby the speed of the boundary layer is increased and thus the danger of separation eliminated. So-called slotted wings are used for this purpose.

Boundary layer separations do not only occur where there is a so-called backward step in the surface body, but also along a smooth surface in locations where there is a sufficient deceleration of the flow directly adjacent the wall surface, thereby causing a back flow. Such zones are indeterminate in size and may, depending on different operational conditions, occur in different locations which are not easily pinpointed.

OBJECTS OF THE INVENTION

In view of the above it is the aim of the invention to achieve the following objects singly or in combination:

to provide a method which will effectively reduce the size of a laminar separated zone or bubble while maintaining its laminar character so that the laminar flow distance or length of the flow along the body is increased;

to localize separation zones by arranging backward steps to thereby effectively reduce the size of the laminar separation bubble;

to prevent a separated laminar boundary layer from becoming turbulent and to make sure that such layer recontacts the surface also in laminar form;

to provide for a substantial gain in the viscous drag reduction; and to minimize the destabilization of a separated boundary layer as much as possible.

SUMMARY OF THE INVENTION

According to the invention the above objectives are achieved by providing at least one flow passage in the body exposed to the flow. The flow passage or flow passages interconnect first and second zones just upstream and downstream of a location where a laminar boundary flow separation is likely to occur, for example, where there are interruptions in the continuity of the contour of the surface of the body located in the flow. The entrance of the flow passage is located at a first zone of relatively high static pressure while the outlet of the flow passage is located in a second zone of relatively low static pressure so that boundary layer material will automatically pass through the flow passage across said separation location for return into the separated boundary layer in the zone of relatively low static pressure.

The invention is based on the discovery that a moderate vertical blowing out of boundary layer material in the second zone just downstream of the laminar separation location can influence the boundary layer profile in an extraordinarily stabilizing manner. As a result, the laminar, separated boundary layer is enabled to reattach itself to the body surface also in laminar form so that a transition is achieved further downstream of the reattachment location. In this manner a gain in the laminar flow distance is achieved and such a gain contributes directly to the reduction of the viscous drag of the body in the flowing medium. Additionally, this method achieves a reduction in the size of the laminar separation bubble which in turn causes a reduction in the compression or pressure drag.

The basic considerations underlying the invention will now be explained. It is well known to influence a boundary layer by sucking off and blowing out and this principle has been used for a long time in many variations, primarily in the aircraft industry. However, sucking off is used almost exclusively for maintaining the laminar flow of the attached boundary layer while the blowing is used in most instances for preventing the separation of a turbulent boundary layer. The theoretical analysis of the effect caused by suction and blowing on the laminar boundary layer speed profile in the separation zones, however, shows that, contrary to a still attached boundary layer, the normal suction of boundary layer material strongly stabilizes the separated boundary layer speed profile relative to the transition. Conversely, the use of normal blowing out shows a strong stabilizing effect on the transition characteristic of the separated boundary layer, whereas blowing into the still attached boundary layer normally results in an immediate transition.

In connection with a separation of the boundary layer downstream of a disturbance in a contour of the body surface, such as sheet metal overlaps, wires, rivet heads and so forth, it is a fact that a zone of small reduced pressure, relative to the static pressure of the free oncoming flow, is established directly downstream of the separation point. The invention is based on the recognition that a blowing out can be accomplished automatically by reason of this pressure difference for stabilizing a laminar separated boundary layer. This automatic blowing out is assured, provided that the blown out boundary layer material is obtained from a zone of higher pressure than the pressure present directly downstream of the separation point.

It has been found that the impulse loss caused by the detouring of the boundary layer material is negligibly small due to the small moving masses and the small speeds of these masses when such impulse loss is compared to the gain in the viscous drag reduction.

A suitable point for sucking off material is provided in the region immediately upstream of the separation point because in that region the suction effect on the still attached laminar boundary layer actually provides an additional gain in stabilization of the still laminar flow.

The dimensions of the suction inlets and the blowing outlets should be selected suitably small enough so that no destabilizing effect occurs on the boundary layer due to the surface roughness caused by the suction inlets and blowing outlets. In order to minimize any destabilizing effect of the blowing out on the instability vibrations of the separated boundary layer due to possible turbulence formation, it is preferable to install a throttle valve in the flow channel between the suction inlets and the suctions outlets for controlling the mass throughput in a continuous manner in the duct system between the suction inlets and blowing outlets. Similarly, it is advantageous to provide a quieting chamber in the duct system just adjacent to the blowing outlets. Simply increasing the cross-sectional flow area of the duct near the blowing outlet may be sufficient for this purpose.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
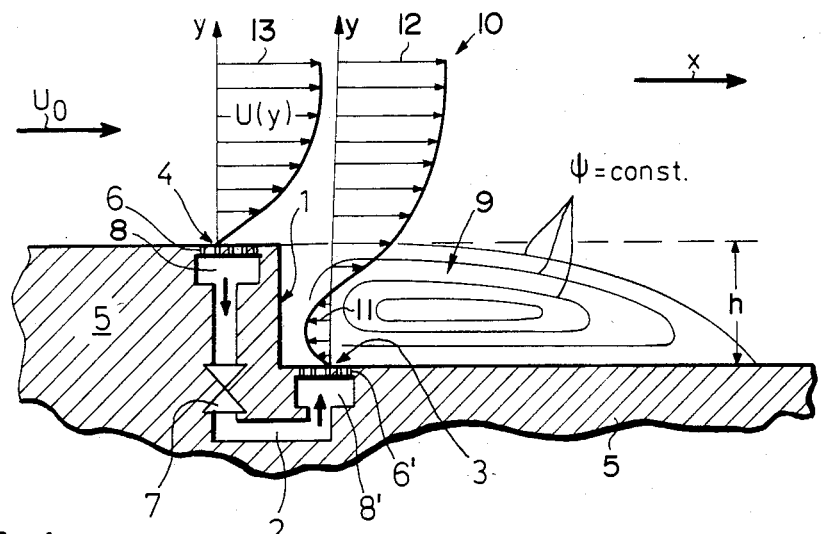
FIG. 1 is a schematic sectional view through a portion of a body in a flow, such as an aircraft wing, with a backward step in the wing surface and illustrating the suction and blowing locations upstream and downstream of the backward step respectively.

In FIG. 1 a flow $U_o$ indicated by the respective arrow travels along the surface of a body 5 in the direction of the arrow x corresponding to the abscissa in a rectangular coordinate system. Upstream of a "two-dimensional" step 1 in the surface of the body 5 the flow is an attached laminar flow as indicated in the ordinate direction y by U(y). The backward facing step 1 has a step height h. Downstream of the step 1 the flow forms a laminar separation bubble 9 which is characterized by constant flow lines $\psi$=const. The flow profile 10 of the separation bubble 9 downstream of the step 1 shows a flow speed distribution which includes, adjacent to the body surface, speed components 11 which are directed contrary to the speed components 12 in the original flow direction. Thus, there is separation just downstream of the step 1. More specifically, $U_o$ is the speed of the free onflow upstream of the step 1 and U(y) is the local speed in the x direction inside the boundary layer as indicated at 13 in FIG. 1.

According to the invention the suction upstream of the step 1 from a zone 4 of higher pressure than the pressure at a zone 3 just downstream of the step 1, takes place through small openings or inlets 6 in the surface of the body 5 and into a flow channel 2 which connects the suction inlet 6 to blowing outlets 6' at the location 3 just downstream of the step 1. The zone 4 is located just upstream of the separation and the blowing outlets 6' are located in the separation zone 3. Preferably, a throttle valve 7 is located in the flow channel 2 for controlling the flow quantity. The transport of boundary layer material through the flow channel 2 is assured due to the pressure differential $\Delta C_p$ between the suction inlet zone 4 and the blow outlet zone 3.

The diameter of the suction inlet 6 is preferably within the range of 50 to 1000 $\mu$m for normal flow speeds of the flowing medium at Mach numbers in the range of about 0.7 to about 0.8. Just downstream of the suction inlet 6 there is a quieting chamber 8 and just upstream of the blowing outlets 6' there is a further quieting chamber 8'.

Figure 2:
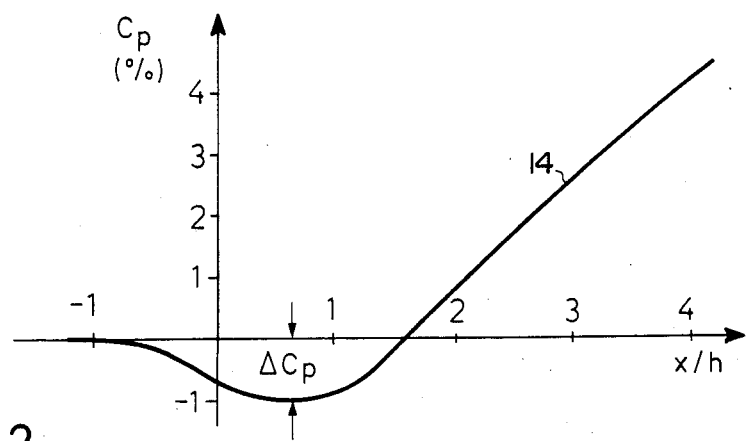
FIG. 2 shows the characteristic pressure curve of the pressure distribution on the body surface as shown in FIG. 1, representing assumed flow conditions.

FIG. 2 shows a typical pressure characteristic for a flow situation as explained above with reference to FIG. 1, whereby the diagram of FIG. 2 is without dimensions. The pressure coefficient $C_p$ is plotted in percent along the ordinate as a function of (x/h), wherein x is the distance from the step 1 in the x direction and h is the step height as mentioned. $C_p$ the dimensionless pressure coefficient is expressed as follows:

$$C_p = \frac{p_x - p_o}{q},$$

wherein $p_x$ is the local static pressure, wherein $p_o$ is the static pressure of the free onflowing medium and $q$ is the pressure head of the free onflowing medium.

FIG. 2 shows that the pressure just upstream of the separation diminishes from the value of the free onflow at $(x/h)=0$ until the minimal value $\Delta C_p$ is reached just downstream of the step 1. This pressure differential is located between the pressure upstream and downstream of the step 1. Further downstream of the step 1 the pressure rises again as shown at 14 in FIG. 2, where it becomes substantially equal to the static pressure of the onflow. Thus, according to the invention the pressure differential $\Delta C_p$ can be used for directly realizing the blowing out of the diverted flow portion through the outlets 6' just downstream of the step 1.

Figure 3:
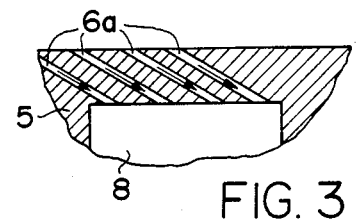
FIG. 3 shows on an enlarged scale a different arrangement of the suction inlets as compared to FIG. 1.

In FIG. 1 the suction inlet 6 and the blowing outlets 6' extend substantially perpendicularly to the surface of the body 5. Contrary thereto, in FIG. 3 the suction inlets 6a extend at a slant relative to the tangential direction. The slant may be quite acute as much as is practically feasible.

Figure 4:
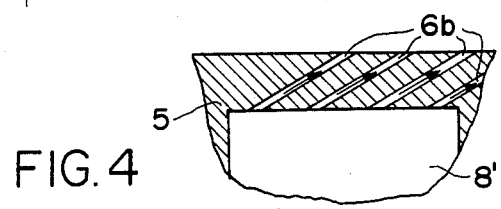
FIG. 4 shows a different arrangement of the blowing outlets as compared to FIG. 1.

Similarly, in FIG. 4, the blowing outlets 6b are also arranged at a slant relative to the surface of the body 5, whereby again the slant may be as acute as is practically feasible.

Although the invention has been described with reference to specific example embodiments, it will be appreciated, that it is intended, to cover all modifications and equivalents within the scope of the appended claims.

What is claimed is:

1. A method for stabilizing laminar, separated boundary layers of a medium flowing in a given flow direction along a boundary surface of a body in said flowing medium, by boundary layer control, comprising the following steps:
    (a) determining in a first zone, where there is a relatively high static pressure, first points on said boundary surface of said body upstream of and directly at a laminar boundary layer separation location (1) forming a disturbance in said boundary surface,
    (b) determining in a second zone, where there is a relatively low static pressure, second points downstream of and directly at said laminar boundary layer separation location (1) forming said disturbance,
    (c) interconnecting corresponding first and second points by flow passage means located inside said body and extending directly across said disturbance for establishing a pressure differential between respective first and second interconnected points,
    (d) utilizing said pressure differential for automatically sucking in flowing medium at said first points for transporting flowing medium from said first points through said flow passage means to said second points directly across said disturbance, and
    (e) blowing flowing medium out of said flow passage means at said second points as a result of said pressure differential for achieving a viscous drag reduction.

2. The method of claim 1, wherein said first points for sucking in flowing medium are located directly upstream of said laminar boundary layer separation location.

3. The method of claim 1, further comprising providing continuous flow control means in said flow passage means for continuously controlling the flow of medium flowing through said flow passage means.

4. The method of claim 1, further comprising providing said flow passage means with at least one sucking-in opening at said first points and with at least one blowing-out opening at said second points and dimensioning the flow cross-sectional area of both said openings of said flow passage means so that the openings have a diameter in the range of about 50 to 1000 microns, whereby a disturbance of said laminar boundary layers outside said flow passage means due to said sucking and blowing steps is substantially avoided.

5. The method of claim 1, wherein said sucking-in is performed in a sucking direction extending substantially perpendicularly to a tangent to said boundary surface.

6. The method of claim 1, wherein said sucking-in is performed in a sucking direction extending at an angle to a tangent to said boundary surface.

7. The method of claim 1, wherein said blowing is performed in a blowing direction extending substantially perpendicularly to a tangent to said boundary surface.

8. The method of claim 1, wherein said blowing is performed in a blowing direction extending at an angle to a tangent to said boundary surface.

9. An apparatus for stabilizing laminar, separated boundary layers of a medium flowing in a given flow direction along a boundary surface of a body in said flowing medium, by boundary layer control, comprising first aperture means in a first zone of said boundary surface where there is a relatively high static pressure, said first zone being located upstream of and directly at a boundary layer separation location forming a disturbance in said boundary surface, second aperture means in a second zone of said boundary surface where there is a static pressure lower than said relatively high static pressure, said second zone being located downstream of and directly at said boundary layer separation location forming said disturbance, flow passage means extending inside said body across said boundary layer separation location for directly bypassing said disturbance by operatively interconnecting said first and second aperture means for automatically passing flowing medium through said flow passage means by suction at said first aperture means and by blowing at said second aperture means as a result of a pressure differential between said first and second aperture means directly across said disturbance, whereby said laminar, separated boundary layers are stabilized across said boundary layer separation location.

10. The apparatus of claim 9, further comprising continuous flow control means in said flow passage means for providing an infinitely variable control of flow through said flow passage means.

11. The apparatus of claim 9, wherein said first and second aperture means have diameters in the range of about 50 to about 1000 microns for avoiding a disturbance of laminar flow outside said flow passage means by said sucking and blowing through said first and second aperture means.

12. The apparatus of claim 9, wherein said first aperture means define an opening plane extending substantially in parallel to said boundary surface.

13. The apparatus of claim 9, wherein said second aperture means define an opening plane extending substantially in parallel to said boundary surface.

14. The apparatus of claim 9, wherein said first aperture means define an opening plane extending at an angle to said boundary surface.

15. The apparatus of claim 9, wherein said second aperture means define an opening plane extending at an angle to said boundary surface.

* * * * *